(12) United States Patent
Bommareddy et al.

(10) Patent No.: US 6,880,089 B1
(45) Date of Patent: Apr. 12, 2005

(54) FIREWALL CLUSTERING FOR MULTIPLE NETWORK SERVERS

(75) Inventors: Satish Bommareddy, San Jose, CA (US); Makarand Kale, Sunnyvale, CA (US); Srinivas Chaganty, San Jose, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/540,297

(22) Filed: Mar. 31, 2000

(51) Int. Cl.[7] .................................................. H04L 9/00

(52) U.S. Cl. ...................................... 713/201; 709/200

(58) Field of Search .......................... 713/201; 709/200

(56) References Cited

U.S. PATENT DOCUMENTS

| | | |
|---|---|---|
| 5,283,897 A | 2/1994 | Georgiadis et al. |
| 5,301,226 A | 4/1994 | Olson et al. |
| 5,473,599 A | 12/1995 | Li et al. |
| 5,513,314 A | 4/1996 | Kandasamy et al. |
| 5,583,940 A | 12/1996 | Vidrascu et al. |
| 5,586,121 A | 12/1996 | Moura et al. |
| 5,608,447 A | 3/1997 | Farry et al. |
| 5,612,865 A | 3/1997 | Dasgupta |
| 5,612,897 A | 3/1997 | Rege |
| 5,634,125 A | 5/1997 | Li |
| 5,652,892 A | 7/1997 | Ugajin |
| 5,655,140 A | 8/1997 | Haddock |
| 5,666,487 A | 9/1997 | Goodman et al. |
| 5,687,369 A | 11/1997 | Li |
| 5,740,375 A | 4/1998 | Dunne et al. |
| 5,754,752 A | 5/1998 | Sheh et al. |
| 5,764,895 A | 6/1998 | Chung |
| 5,774,660 A | 6/1998 | Brendel et al. |

(Continued)

FOREIGN PATENT DOCUMENTS

| | | |
|---|---|---|
| JP | 409321789 | 12/1997 |
| WO | WO 99/32956 | 7/1999 |

OTHER PUBLICATIONS

Internet—"Quasi–Dynamic Load–Balancing (QDLB) Methods." Apr. 25, 1995, pp. 2 and 5.
IBM, Document Identifier: NN9305363 "Value–Oriented Approach To Selecting *Buckets* For Dat Redistribution," West, May 1, 1993.
Internet—Becker, Wolfgang, "Dynamic Load Balancing For Parallel Database Processing," Institute of Parallel and Distributed High–Performance Systems (IPVR), University of Stuttgart Breitwiesenstr, Stuttgart, Germany, 1997.
Omiecinski, Edward, "Performance Analysis of a Load Balancing Hash–Join Algorithm for a Shared Memory Multiprocessor," The ACM Sigmod Anthology, 17th International Conference of Very Large Data Bases, Sep. 3, 1991.

*Primary Examiner*—Kim Vu
*Assistant Examiner*—Thanhnga Truong
(74) *Attorney, Agent, or Firm*—David Volejnicek

(57) ABSTRACT

A firewall clustering system connects two or more firewalls between an internal network and an external network. The plurality of two or more firewalls are combined to supply high-availability and scaling of processing capacity. Firewalls maintain client-server state information. Flow controllers are connected to the firewalls and placed on both the internal "trusted" side and the external "untrusted" side of the firewalls. Flow controllers are placed on both sides of the firewalls to ensure that traffic for a given client-server session flows through the same firewall in both inbound and outbound directions. The firewalls perform filtering operations and/or network address translation (NAT) services. In both cases, the flow controllers supply high availability, scalability, and traffic distribution for the firewalls in the firewall cluster.

42 Claims, 8 Drawing Sheets

Microfiche Appendix Included
(2 Microfiche, 122 Pages)

U.S. PATENT DOCUMENTS

| | | |
|---|---|---|
| 5,774,668 A | 6/1998 | Choquier et al. |
| 5,796,941 A | 8/1998 | Lita |
| 5,805,804 A | 9/1998 | Laursen et al. |
| 5,812,819 A | 9/1998 | Rodwin et al. |
| 5,815,668 A | 9/1998 | Hashimoto |
| 5,828,833 A | 10/1998 | Belville et al. |
| 5,835,696 A | 11/1998 | Hess |
| 5,835,710 A | 11/1998 | Nagami et al. |
| 5,862,338 A | 1/1999 | Walker et al. |
| 5,864,666 A | 1/1999 | Shrader |
| 5,898,830 A | 4/1999 | Wesinger, Jr. et al. |
| 5,920,699 A | 7/1999 | Bare |
| 5,936,936 A | 8/1999 | Alexander, Jr. et al. |
| 5,949,753 A | 9/1999 | Alexander, Jr. et al. |
| 5,951,634 A | 9/1999 | Sitbon et al. |
| 5,959,990 A | 9/1999 | Frantz et al. |
| 5,963,540 A | 10/1999 | Bhaskaran |
| 5,999,536 A | 12/1999 | Kawafuji et al. |
| 6,006,259 A * | 12/1999 | Adelman et al. ........... 709/223 |
| 6,006,264 A | 12/1999 | Colby et al. |
| 6,047,319 A | 4/2000 | Olson |
| 6,078,957 A | 6/2000 | Adelman et al. |
| 6,097,882 A | 8/2000 | Mogul |
| 6,098,093 A * | 8/2000 | Bayeh et al. ............... 709/203 |
| 6,101,616 A | 8/2000 | Joubert et al. |
| 6,108,300 A | 8/2000 | Coile et al. |
| 6,141,755 A | 10/2000 | Dowd et al. |
| 6,226,684 B1 | 5/2001 | Sung et al. |
| 6,266,335 B1 | 7/2001 | Bhaskaran |
| 6,295,276 B1 | 9/2001 | Datta et al. |
| 6,356,985 B1 | 3/2002 | Ichimi et al. |
| 6,389,448 B1 | 5/2002 | Primak et al. |
| 6,397,260 B1 | 5/2002 | Wils et al. |
| 6,484,261 B1 | 11/2002 | Wiegel |
| 6,530,032 B1 | 3/2003 | Shew et al. |
| 6,606,708 B1 * | 8/2003 | Devine et al. .............. 713/201 |
| 6,647,400 B1 * | 11/2003 | Moran ........................ 707/205 |

* cited by examiner

FIREWALL CLUSTERING FOR MULTIPLE NETWORK SERVERS

CROSS REFERENCE TO RELATED APPLICATIONS

Application Ser. No. 08/994,709, now U.S. Pat. No. 6,266,335, entitled "Cross-Platform Server Clustering Using A Network Flow Switch," discloses and claims flow switch features used in the system of this invention. U.S. Pat. No. 5,963,540, entitled "Router Pooling in a Network Flow Switch," discloses and claims router fault-tolerance and router load-balancing features used in the system of this invention. Application Ser. No. 08/992,038, now U.S. Pat. No. 6,601,084, entitled "Dynamic Load Balancer for Multiple Network Servers," discloses and claims load-balancing used in the system of this invention. Co-pending application Ser. No. 09/540,238, entitled "Firewall Pooling in a Network Flowswitch," discloses and claims pooling used in the system of this invention. Co-pending application Ser. No. 09/540,296, entitled "Router Clustering for Multiple Network Servers." All cited applications and the patents are incorporated herein by reference in their entirety.

CROSS REFERENCE TO APPENDIX

This patent application includes a microfiche Appendix A, which is part of the present disclosure, and which is incorporated by reference herein in its entirety. This Appendix consists of a total of 2 sheets that contain a total of 122 frames. Appendix A is a listing in pseudocode of software code for embodiments of the present invention, which are described more completely below.

BACKGROUND OF THE INVENTION

1. Field of the Invention

The present invention relates generally to computer networking and, in particular, to a system that performs clustering of firewalls in multiple network servers.

2. Discussion of Related Art

Increasing numbers of companies are conducting transactions and building relationships online, with consumers and business partners in a phenomenon called "e-business."

E-business is usage of Internet-based technologies to improve communications with customers and information exchange with business partners, and to increase sales. Web sites, electronic commerce, intranets, and extranets are all examples of E-business entities. Many Web, DNS, proxy, FTP, firewall, and application-server services are needed in any of these environments. If any of the services fails or responds slowly, the entire system suffers. Downtime in today's highly competitive marketplace can mean lost revenue and lost credibility.

Adding more memory or substituting a larger server can expand the capacity of an E-business entity, such as a Website. In either case, expansion requires downtime and an additional capital expenditure. In conventional systems, the only way to supply a reliable capacity to meet a rapidly increasing demand is to purchase computing power far beyond that which meets current needs. Then, once the demand exceeds the purchased computing power, the entire computer must be replaced and the purchase cycle repeated. The conventional business practice is highly inefficient, wasteful of operating expenses, and inadequate for meeting customer needs.

One technique for improving the reliability and responsiveness of Internet sites is the usage of server clusters. Server clusters are arrays of servers that share common tasks while appearing to external devices as single resources. In a cluster each server shares the load that would be handled traditionally by a large server alone. A user accesses a cluster in the same manner as a single server is accessed.

One type of device server that can be arranged in a cluster is a proxy server in a firewall. The proxy server is a component of a firewall that controls internal users' access to the outside world, for example the Internet, and Internet users' access to an Internal network. In some cases, the proxy server blocks all outside connections and only allows internal users to access the Internet. The only packets allowed back through the proxy server are packets that return responses to requests from inside the firewall. In other cases, both inbound and outbound traffic is allowed under strictly-controlled conditions.

Clusters improve both reliability and scalability of operation in comparison to single-server operation. Redundant servers in a cluster support tolerance to system failures.

Several basic approaches to Internet server clustering and load balancing are presently available. One approach is the usage of software executing on one or more servers to create clusters of Internet Servers. The clusters are peer-to-peer clusters with no arbitrator or manager. According to measurements using benchmarking tools, software-based cluster performance is generally poor, since servers in the cluster must devote significant amounts of computing power to manage the cluster. Also, communications among the servers for cluster management and resource arbitration add large amounts of data onto the network connecting the servers.

A second approach is the usage of "load balancing" software executing on special-purpose industrial PCs. A PC executing the load balancing software broadcasts its PC Internet Protocol (IP) address as an identification address of the cluster of Internet servers. As network traffic is received, the load balancing system uses a technology known as Network Address Translation (NAT) to modify each packet, changing the destination address from its IP address to the actual address of the server that is to receive the traffic. The server responds to the request and the PC load balancing software again uses NAT to modify the "From" address in each packet to create the appearance that the PC load balancer sent the packets. PC load balancers are restricted to applications that use TCP/IP (Transmission control protocol/Internet protocol), effectively limiting the applications to technologies including Web servers, firewall servers, and proxy servers. The TCP/IP products usually become a bottleneck for data traffic into and out of the cluster, slowing overall performance. NAT technology requires that the body of each packet be available to the processor, so a cluster based on a PC load balancer cannot be used if the data packets are encrypted.

A third approach is the usage of load balancing software that executes from a local area network (LAN) switch rather than a PC. Execution from the switch hardware increases data transfer rates but remains based on NAT technology using TCP/IP, limiting applications to Web servers, firewall servers, and proxy servers. Switch-based and PC load balancers cannot be used when the data packets are encrypted.

What is needed is a firewall system and operating method that attains very high data throughput rates and supports all Internet protocols.

SUMMARY OF THE PRESENT INVENTION

A firewall clustering system connects two or more firewalls between an internal network and an external network.}

The plurality of two or more firewalls is combined to supply high-availability and scaling of processing capacity. Firewalls maintain client-server state information. Flow controllers are connected to the firewalls and placed on both the internal "trusted" side and the external "untrusted" side of the firewalls. Flow controllers are placed on both sides of the firewalls to ensure that traffic for a given client-server session flows through the same firewall in both inbound and outbound directions. The firewalls perform filtering operations and/or network address translation (NAT) services. In both cases, the flow controllers supply high availability, scalability, and traffic distribution for the firewalls in the firewall cluster.

Various implementations of the firewall clustering system have several firewall clustering features and benefits. Both inbound and outbound traffic is distributed between firewalls on both the internal and external sides of the firewalls. The flow controller distributes traffic based on the source and destination IP addresses of a packet, thus ensuring that all IP-based protocols are supported.

In some embodiments, all outgoing traffic for a single client-server session is handled by the same firewall in both the inbound direction and the outbound direction. The flow controller supports unlimited client-server sessions.

For communication interconnects using a firewall clustering system, servers need not be configured with multiple firewall IP addresses for a gateway. Servers are configured to use a single 'logical' firewall having an IP address identifying the internal firewall cluster.

Routers can be configured with either a single or multiple firewall IP addresses for a gateway. Routers are configured to use a single "logical" firewall having an IP address the same as the external firewall cluster.

In some implementations, the firewall clustering system continually monitors the operational health of the routers and associated internal and external links.

In some implementations, the firewall clustering system detects one or more of various failure conditions including: (1) failure of the firewall internal LAN interface and link, (2) failure of the firewall external LAN interface and link, and (3) failure of the firewall due to power outage, software malfunction, hardware malfunction, or other condition. When the firewall clustering system detects a failure, traffic is automatically forwarded to the remaining operational firewall or firewalls in both the inbound and outbound directions. The firewall clustering system does not require manual intervention at the server to bypass the failed firewall.

The firewall clustering system supports Ping functionality and Address Resolution Protocol (ARP) for detection with data management zone (DMZ) support. A configuration of a firewall clustering system can also cluster three interfaces including external, internal, and data management zone (DMZ) regions. One flow controller is connected to each interface of the firewalls for the internal, external, and DMZ zones for a total of three flow controllers.

Additional firewalls may be seamlessly added to supply additional bandwidth and greater fault tolerance.

The firewall clustering system operates in a manner that is independent of the firewall hardware and software. Various combinations of firewalls can exist in the cluster.

In one aspect of a firewall clustering system, a firewall cluster creator creates or configures a firewall cluster on both internal and external network flow controllers. To create a firewall cluster on an internal network flow controller, an administrator assigns to the cluster a logical Internal Protocol (IP) address $IP_{Cint}$ and specifies firewalls, Firewall1:$IP_{F1int}$ and Firewall2:$IP_{F2int}$, that are members of the firewall cluster. The IP address of an external network flow controller ($IP_{HFE}$) is configured as a peer unit that is probed using Ping packets at a configured polling interval. If the firewalls are performing NAT, then the firewall cluster zone is configured as internal.

To create a firewall cluster on an external network flow controller, the administrator assigns the cluster a logical IP address $IP_{Cext}$ and specifies firewalls, Firewall1:$IP_{F1ext}$ and Firewall2:$IP_{F2ext}$, that are members of the firewall cluster. The IP address of an internal network flow controller ($IP_{HFI}$) is configured as a peer unit that is probed using Ping packets at a configured polling interval. If the firewalls are performing NAT, then the firewall cluster zone is configured as external.

The internal and external network flow controller units monitor the health of the firewalls by sending Ping packets through both the internal and the external firewalls, effectively testing the operational state of the firewall and the internal and external links.

In some implementations, the logical internal firewall cluster address $IP_{Cint}$ is configured on the servers at the site as a 'default' gateway rather than a unique IP address of one of the firewall's internal interfaces. The logical external firewall cluster address $IP_{Cext}$ is configured on the servers at the site as a 'next-hop' gateway rather than a unique IP address of one of the firewall's external interfaces.

The internal network flow controller responds to an Address Resolution Protocol (ARP) request from the servers to identify a Media Access Control (MAC) address associated with the firewall cluster $IP_{Cint}$. The external network flow controller responds to an Address Resolution Protocol (ARP) request from the servers to identify a Media Access Control (MAC) address associated with the firewall cluster $IP_{Cext}$.

In another aspect of the firewall clustering system, a traffic distributor includes internal and external network flow controller units that mutually distribute message traffic. The network flow controller units select a firewall of the plurality of firewalls in a cluster to forward the traffic based on information in the packet header. When the firewalls are only performing packet filtering, both the internal and the external network flow controller units use the source and destination IP address and port to identify the client-server-flow.

When the firewalls are performing NAT, the external network flow controller unit uses the packet source IP address to distribute inbound traffic for the firewall cluster. The internal network flow controller unit uses the packet destination IP address to distribute outbound traffic for the firewall cluster. For example, the IP address of a device on the Internet corresponds both to the source IP address for the external unit and to the destination IP address for the internal unit. Both network flow controller units use the same packet information to determine the traffic distribution.

Internally, each of the network flow controller units maintains a list of operational firewalls. Fields from the packet are used to compute the index into the list, indicating the firewall that is to be used. To ensure that the same firewall is selected by both the internal flow controller and the external flow controller, the order of configuration of the firewalls must be the same on both network flow controller units. Thus, for any given client-server connection flow, the same firewall is used by both the internal and external network flow controller units for every inbound and outbound packet, so long as the firewall remains operational.

Each firewall has an equal probability of assignment for a flow for processing, since the traffic distributor uses only information in the packet IP header to select between firewalls. Processing load or potential processing power of the firewall is not analyzed in the selection.

A clustering system operates on all types of Internet protocol (all/IP) technologies and can be used to create a cluster of any Internet servers, no matter what protocol is running on IP, even Voice over Internet protocol (VoIp) and streaming audio/video via User Datagram Protocol (UDP/IP).

The clustering system avoids problems associated with NAT, such as inability to encrypt the data, because the all/IP approach allows each of the servers in the cluster to use the same IP address as the cluster's overall address.

In some embodiments, the clustering system executes on local area network (LAN) switch hardware to attain very high data throughput rates.

Unlike switch-based load balancers, a clustering system does not process packets flowing from servers to users, the direction of the largest data flow. Instead, the firewall clustering system operates as a wire-speed switch for downstream traffic.

Advantages of a clustering system depend on the particular implementation of the system. One advantage is that capacity of the cluster increases linearly as additional servers are added to the cluster. In various implementations, the clustering system manages all or some of the cluster activities, freeing servers in the cluster from expending computing power on cluster management.

The clustering system controls connections of clients to particular servers, reducing the computing required to manage the cluster on servers in the cluster and freeing computing power to be applied to the task of the cluster.

The clustering system can manage many different clusters simultaneously, allowing specific hardware to easily migrate from one cluster to another, as demand patterns dictate.

Management of a clustering system and one or more clusters is accomplished through any of several different management methods, including telnet, CLI, Web browser, and SNMP. The clustering system assists customers with an easy-to-use single point of management to control multiple clusters in multiple tiers of computing. The clustering system allows administrators to choose the management method that works best for the particular business characteristics and facility.

BRIEF DESCRIPTION OF THE DRAWING

The features of the described embodiments believed to be novel are specifically set forth in the appended claims. However, embodiments of the invention relating to both structure and method of operation, may best be understood by referring to the following description and accompanying drawing.

DETAILED DESCRIPTION

Figure 1:
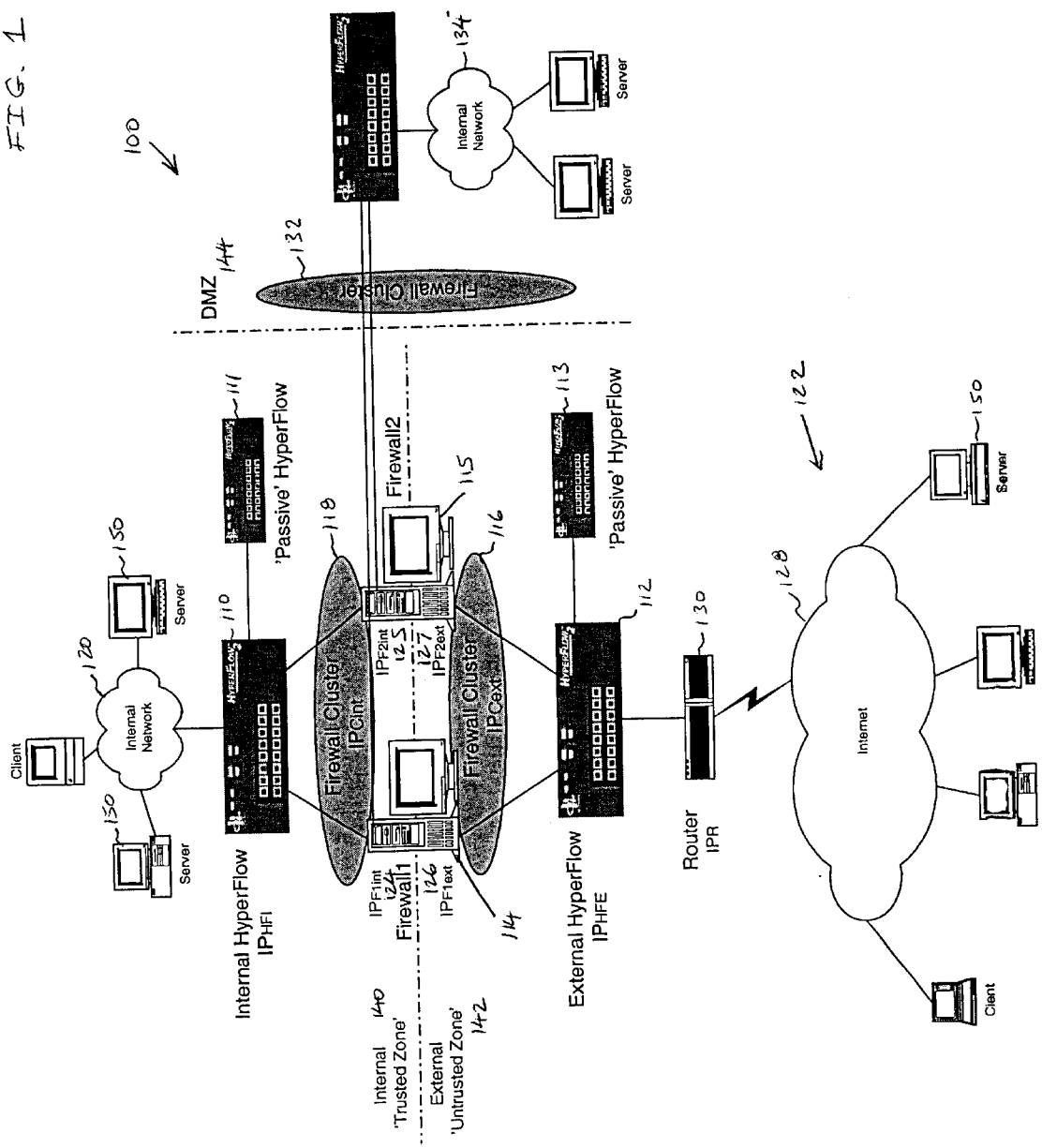
FIG. 1 is a schematic block diagram that illustrates an embodiment of a firewall clustering system that connects two or more firewalls to two or more distinct networks.

Referring to FIG. 1, a schematic block diagram illustrates an embodiment of a firewall clustering system 100 that connects two or more firewalls to two or more distinct networks. For example Firewall1 114 and Firewall2 115 interconnect to two or more distinct networks such as an internal network 120 and an external network 122, here the Internet 128, in an arrangement with high-availability and scaling of processing capacity. Firewalls maintain client-server state information and protect the information from undesired transfer across the internal-external boundary.

Flow controllers are connected to the firewalls and placed on both the internal "trusted" side and the external "untrusted" side of the firewalls. A plurality of network flow controllers, for example an internal flow controller $IP_{HFI}$ 110 and an external network flow controller $IP_{HFE}$ 112, manage an internal firewall cluster $IP_{Cint}$ 118 and an external firewall cluster $IP_{Cext}$ 116. The illustrative configuration includes optional redundant network flow controllers to ensure reliability with the internal network flow controller $IP_{HFI}$ 110 backed by a passive internal network flow controller 111 and the external network flow controller $IP_{HFE}$ 112 backed by a passive external network flow controller 113. Redundant flow controllers avoid difficulties that arise with a single point of failure.

The internal network flow controller $IP_{HFI}$ 110 includes a processor (not shown) and storage (not shown) that execute special-purpose software and manage an internal portion $IP_{F1int}$ 124 of Firewall1 114 and an internal portion $IP_{F2int}$ 125 of Firewall2 115. The external network flow controller $IP_{HFE}$ 112 is typically similar to internal network flow controller $IP_{HFI}$ 110 and manages an external portion $IP_{F1ext}$ 126 of Firewall1 114 and an external portion $IP_{F2ext}$ 127 of Firewall2 115. An internal and an external portion are, and are referred to below without distinction as, either internal and external interfaces of an individual firewall or as a pair of individual internal and external firewalls.

The network flow controllers may connect to the associated network via a router. In the illustrative example, a router IPR 130 connects the external network flow controller $IP_{HFE}$ 112 to the Internet 128.

Flow controllers (internal network flow controller $IP_{HFI}$ 110 and external network flow controller $IP_{HFE}$ 112) are placed on both sides of the firewalls to ensure that traffic for a given client-server session flows through the same firewall in both inbound and outbound directions. The firewalls perform filtering operations and/or network address translation (NAT) services. In both cases, the flow controllers supply high availability, scalability, and traffic distribution for the firewalls in the firewall cluster.

Additional firewalls may be added to the firewall clustering system 100. For example, a data management zone (DMZ) firewall cluster 132 connects a DMZ internal network 134 to the internal firewall cluster $IP_{Cint}$ 118 and the external firewall cluster $IP_{Cext}$ 116. A DMZ network flow controller 136 manages the DMZ firewall cluster 132.

Various implementations of the firewall clustering system 100 have several features and benefits of firewall clustering. Both inbound and outbound traffic is distributed between firewalls on both the internal 140 and external 142 sides of the firewalls Firewall1 114 and Firewall2 115. The flow controllers (internal network flow controller $IP_{HFI}$ 110 and external network flow controller $IP_{HFE}$ 112) distribute traffic based on the source and destination IP addresses of a packet, thus ensuring that all IP-based protocols are supported.

In some embodiments, all outgoing traffic for a single client-server session is handled by the same firewall in both the inbound direction and the outbound direction. The flow controllers support unlimited client-server sessions.

For communication interconnects using the firewall clustering system 100, servers 150 need not be configured with multiple-firewall IP addresses for a gateway. Servers 150 are configured to use a single 'logical' firewall having an IP address identifying the internal firewall cluster $IP_{Cint}$ 118.

Routers 130 can be configured with either a single or multiple firewall IP addresses for a gateway. Routers 130 are configured to use a single "logical" firewall having the same IP address as the external firewall cluster.

In some implementations, the firewall clustering system 100 continually monitors the operational health of the routers 130, the firewalls, and associated internal and external links.

In some implementations, the firewall clustering system 100 detects one or more of various failure conditions, including: (1) failure of the firewall internal LAN interface and link, (2) failure of the firewall external LAN interface and link, and (3) failure of the firewall due to power outage, software malfunction, hardware malfunction, or other condition. When the firewall clustering system 100 detects a failure, traffic is automatically forwarded to the remaining operational firewall or firewalls in both the inbound and outbound directions. The firewall clustering system 100 does not require manual intervention at the server to bypass the failed firewall.

The firewall clustering system 100 supports Ping functionality and Address Resolution Protocol (ARP) for detection with data management zone (DMZ) support. A configuration of a firewall clustering system 100 can also cluster interfaces for external zone 142, internal zone 140, and data management zone (DMZ) 144. One flow controller is connected to each interface of the firewalls for the internal, external, and DMZ zones for a total of three flow controllers: internal network flow controller $IP_{HFI}$ 110, external network flow controller $IP_{HFE}$ 112, and DMZ network flow controller 136.

Additional firewalls may be seamlessly added to supply additional bandwidth and greater fault-tolerance.

The firewall clustering system 100 operates in a manner that is independent of the firewall hardware and software. Various combinations of firewalls can exist in the cluster.

The firewall clustering system 100 includes multiple control processes that execute on the internal network flow controller $IP_{HFI}$ 110, the external network flow controller $IP_{HFE}$ 112, the DMZ network flow controller 136, and associated passive flow controllers. One control process is a firewall-cluster creator that crates or configures the firewall clusters 116 and 118.

Figure 2:
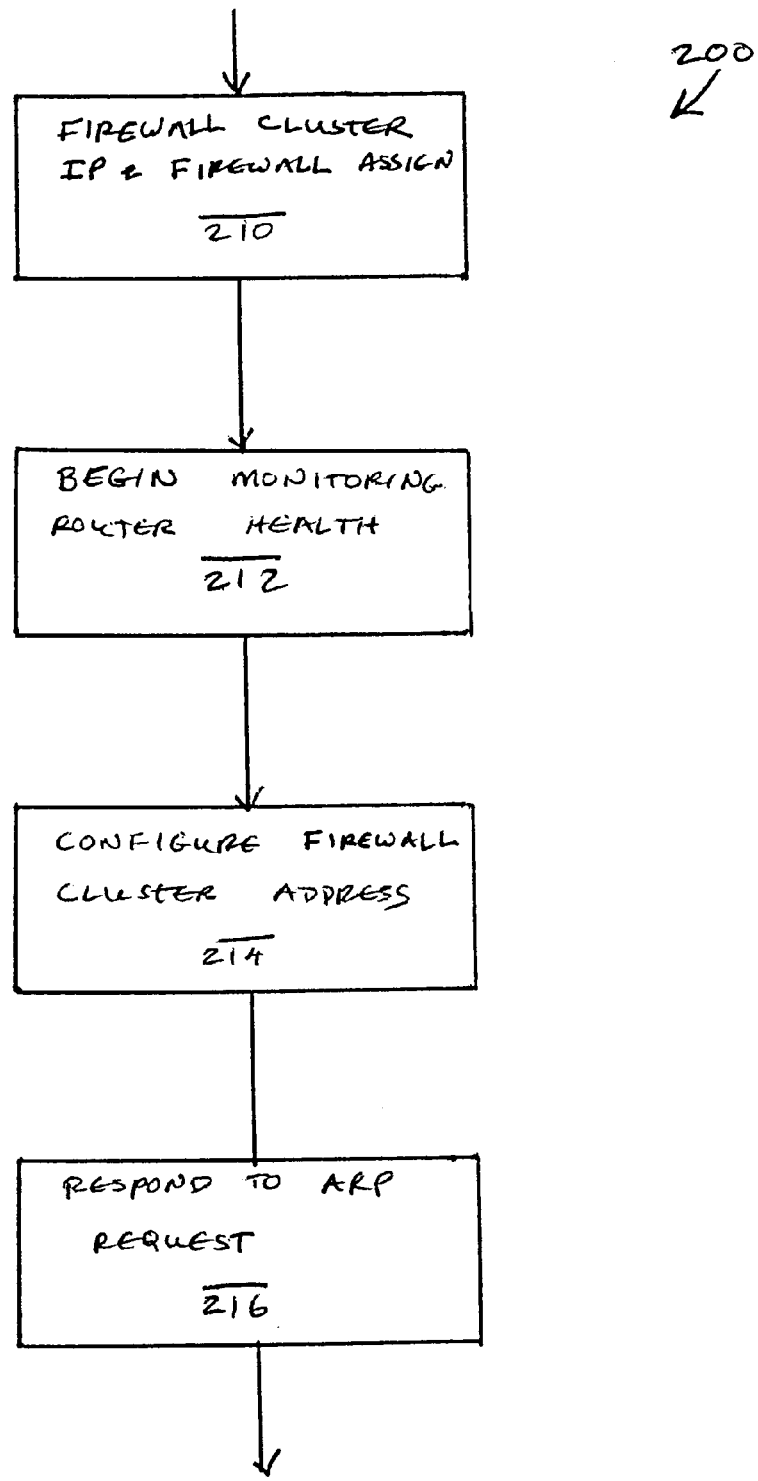
FIG. 2 is a schematic flow chart that depicts operations of a firewall cluster creator.

Referring to FIG. 2 in conjunction with FIG. 1, a schematic flow chart depicts operations of a firewall cluster creator 200.

To create or configure the firewall clusters 116 and 118 on both internal and external network flow controllers 110 and 112, in a firewall cluster IP and firewall assignment operation 210 an administrator assigns to the cluster a logical Internet protocol (IP) address $IP_{Cint}$. The administrator also specifies firewalls, Firewall1:$IP_{F1int}$ 124 and Firewall2:$IP_{F2int}$ 125, as members of the firewall cluster 118. The IP address of an external network flow controller ($IP_{HFE}$) 112 is configured as a peer unit that is probed using Ping packets at a configured polling interval. If the firewalls are performing NAT, then the firewall cluster zone is configured as internal 140.

To create a firewall cluster 116 on an external network flow controller 112, the administrator assigns the cluster a logical IP address $IP_{Cext}$ and specifies firewalls, Firewall1:$IP_{F1ext}$ 126 and Firewall2:$IP_{F2ext}$ 127, that are members of the firewall cluster 116. The IP address of an internal network flow controller ($IP_{HFI}$) 110 is configured as a peer unit that is probed using Ping packets at a configured polling interval. If the firewalls are performing NAT, then the firewall cluster zone is configured as external 142.

In a begin monitoring firewall health operation 212, the internal and external network flow controller units 110 and 112 monitor the health of the firewalls 118 and 116. The network flow controller units 110 and 112 send Ping packets through both the internal and the external firewall clusters 118 and 116, effectively testing the operational state of the firewall and the internal and external links.

In a configure firewall cluster address operation 214, which may be optional, the logical internal firewall cluster address $IP_{Cint}$ is configured on the servers 150 at the site as a 'default' gateway rather than a unique IP address of one of the firewalls internal interfaces $IP_{F1int}$ 124 and $IPF_{2int}$ 125. The logical external firewall cluster address $IP_{Cext}$ is configured on the servers 150 at the site as a 'next-hop' gateway rather than a unique IP address of one of the firewalls external interfaces.

In a respond to ARP request operation 216, the internal network flow controller 110 responds to an Address Resolution Protocol (ARP) request from the servers 150 to identify a Media Access Control (MAC) address associated with the firewall cluster $IP_{Cint}$. The external network flow controller 112 responds to an Address Resolution Protocol (ARP) request from the servers 150 to identify a Media Access Control (MAC) address associated with the firewall cluster $IP_{Cext}$.

Figure 3:
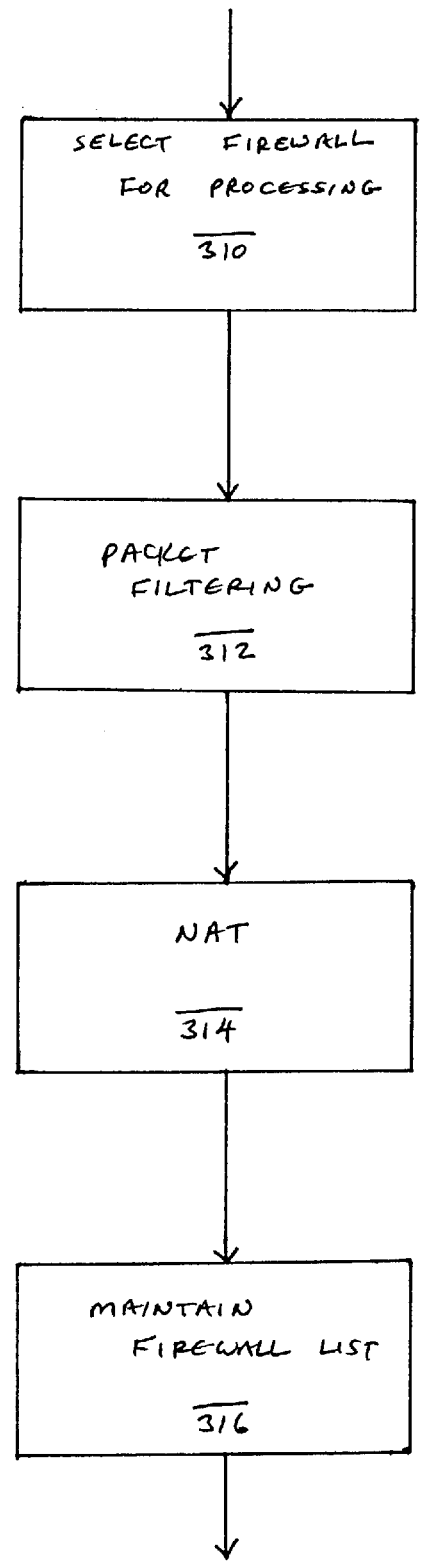
FIG. 3 is a schematic flow diagram showing operations of a traffic distributor.

Another control process is a traffic distributor 300 that includes internal and external network flow controller units 110 and 112 that mutually distribute message traffic. Referring to FIG. 3 in combination with FIG. 1, a schematic flow diagram shows operations of a traffic distributor 300. The traffic distributor executes from the network flow controllers 110 and 112. The traffic distributor 300, in a select firewall for processing operation 310, selects a firewall from among the firewall clusters 116 and 118 to forward the traffic based on information in the packet header. In a packet filtering operation 312, the firewalls 116 and 118 are only performing packet filtering, and both the internal and the external network flow controller units 110 and 112 use the source and destination IP address and port to identify the client-server flow.

When the firewalls are performing NAT 314, the external network flow controller unit 112 uses the packet source IP address to distribute inbound traffic for the firewall cluster 116. The internal network flow controller unit 110 uses the packet destination IP address to distribute outbound traffic for the firewall cluster 118. For example, the IP address of a device on the Internet corresponds both to the source IP address for the external unit and the destination IP address for the internal unit. Both network flow controller units 110 and 112 use the same packet information to determine the traffic distribution.

In a maintain firewall list operation 316, each of the network flow controller units 110 and 112 internally maintains a list of operational firewalls. Fields from the packet are used to compute the index into the list, indicating the firewall that is to be used. To ensure that the same firewall is selected by both the internal flow controller and the external flow controller, the order of configuration of the firewalls must be the same on both network flow controller units. Thus, for any given client-server connection flow, the same firewall is used by both the internal and external network flow controller units for every inbound and outbound packet, so long as the firewall remains operational.

Each firewall has an equal probability of assignment for a flow for processing, since the traffic distributor uses only information in the packet IP header to select between firewalls. Processing load or potential processing power of the firewall is not analyzed in the selection.

Figure 4:
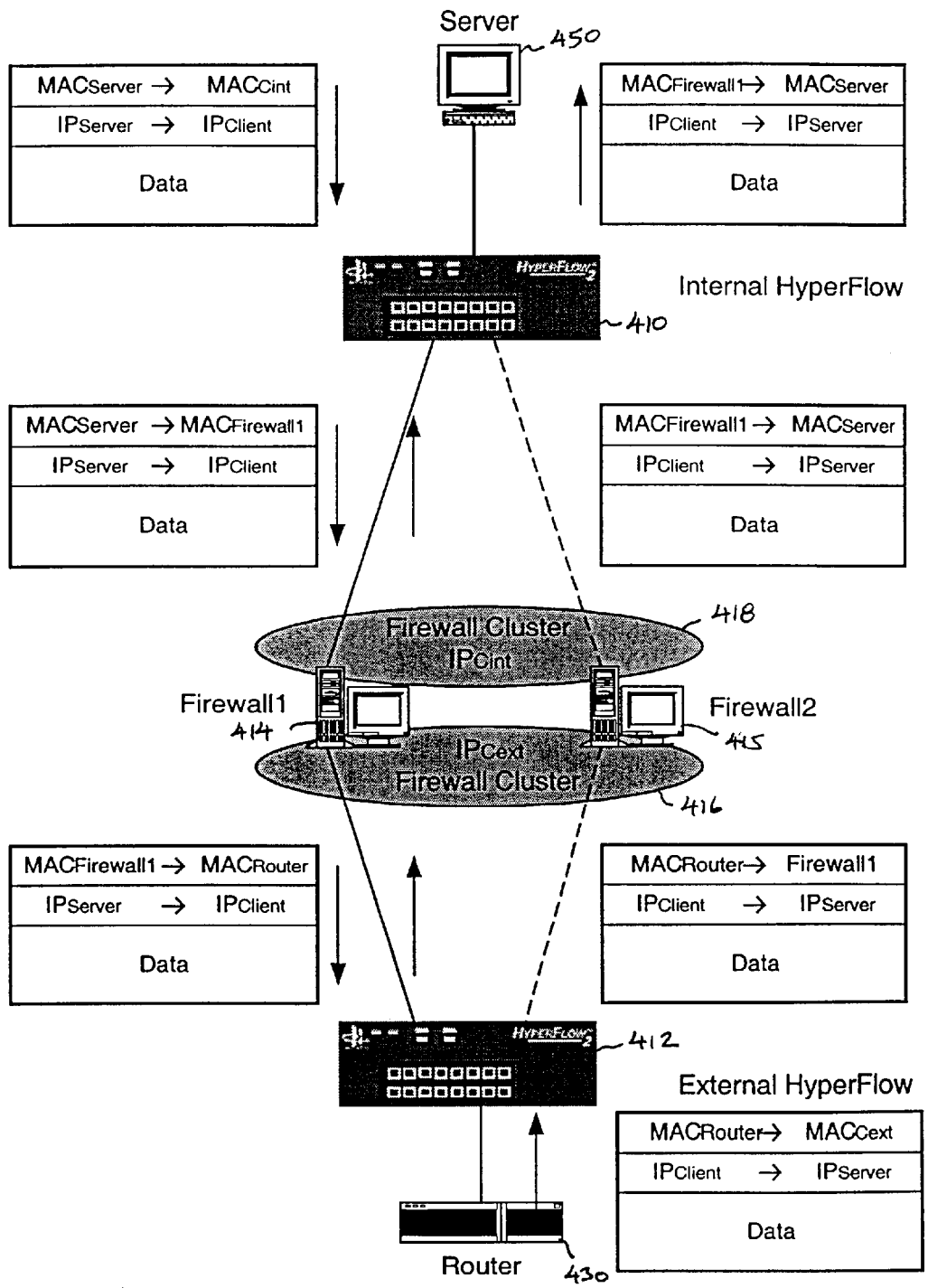
FIG. 4 is a schematic block diagram and associated transition tables that illustrate a technique for transferring a packet between a server and a client using a firewall clustering system.

Referring to FIG. 4, a schematic block diagram and associated transition tables depict a technique for transferring a packet between a server 450 and a client that is assigned to use Firewall1 414 by an internal network flow controller $IP_{HFI}$ 410 and an external network flow controller $IP_{HFE}$ 412. The IP address of the firewall cluster $IP_{Cint}$ and $IP_{Cext}$ do not appear in the packet, since the firewall cluster 116 or 118 is only a gateway on a path between the source and the actual end destination. The IP address of the firewall will appear in the packet if NAT is performed on the firewalls.

Figure 5:
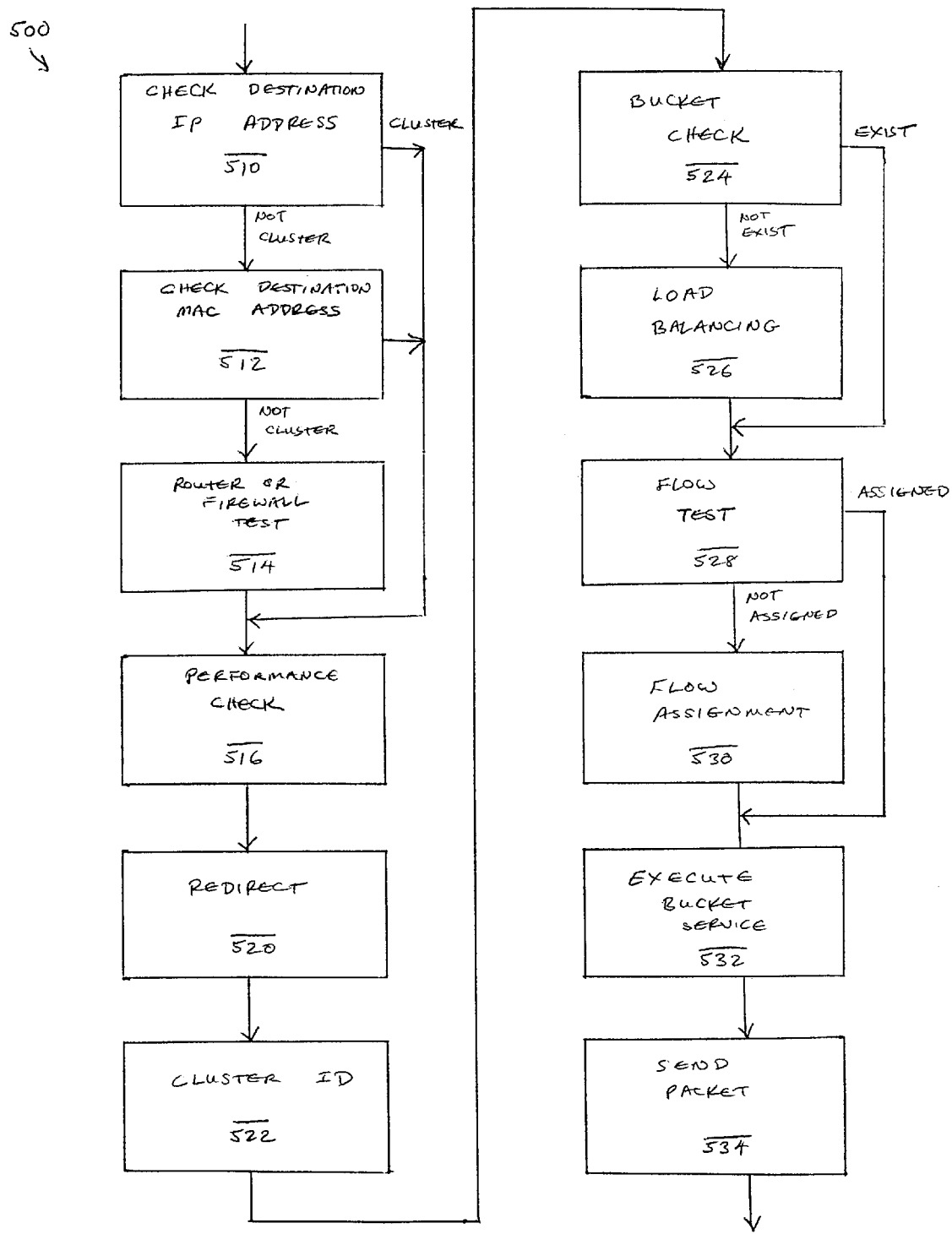
FIG. 5 is a flow diagram that illustrates a further implementation of a traffic-distribution method.

Referring to FIG. 5, a flow diagram illustrates a traffic-distribution method 500. In a check destination IP address operation 510, a traffic distributor checks the destination IP address of a packet to determine whether the destination IP address is a cluster address. If so, the traffic distributor in a performance check operation 516 verifies performance of routers within the cluster, and then may redirect flow in a redirect operation 520 if warranted by results of the performance check operation 516.

If the check destination IP address operation 510 determines that the destination IP address is not a cluster address, then, in a check destination MAC address operation 512, the traffic distributor checks to determine whether the destination MAC address is a cluster address. The destination MAC address matches the cluster address when a Proxy ARP is used to indicate to attached routers that the MAC address of the network flow controller is used when sending packets to any of the configured cluster IP addresses. If the MAC address matches the cluster address, the traffic distributor in the performance check operation 516 verifies performance of routers within the cluster, and then may redirect flow in the redirect operation 520 if warranted by performance check results.

If the check destination MAC address operation 512 determines that the MAC address is not a cluster address, then, in a router or firewall test operation 514, the traffic distributor performs router/firewall pooling, using the MAC address to determine whether the MAC address specifies a router or a firewall. Pooling is described in more detail in co-pending application Ser. No. 09/540,238, entitled "Firewall Pooling in a Network Flowswitch."

In the redirect operation 520, the traffic distributor redirects traffic to one of the routers or firewalls in the cluster, if redirection is warranted. Generally, traffic is redirected within routing cluster elements for any new packet of a string of packets. Thus, the first packet in a flow is generally and subsequent packets are directed to the same routing cluster element as the first packet. A first redirection operation is a set cluster identifier operation 522 in which the cluster address in the form of either the MAC address or the destination IP address is set to identify the cluster data structure. A bucket check operation 524 determines whether at least one bucket exists in a cluster data structure. If the cluster data structure does not include at least one bucket, a load balancing operation 526 retrieves an appropriate bucket that attains load balancing.

A flow test operation 528 determines whether the flow is assigned to the bucket and, if not, performs a flow assignment operation 530 that assigns buckets to a server. The traffic distributor executes a bucket service operation 532 with the buckets used to forward data requests from clients to servers. A packet is then sent to the firewall in send packet operation 534.

Figure 6:
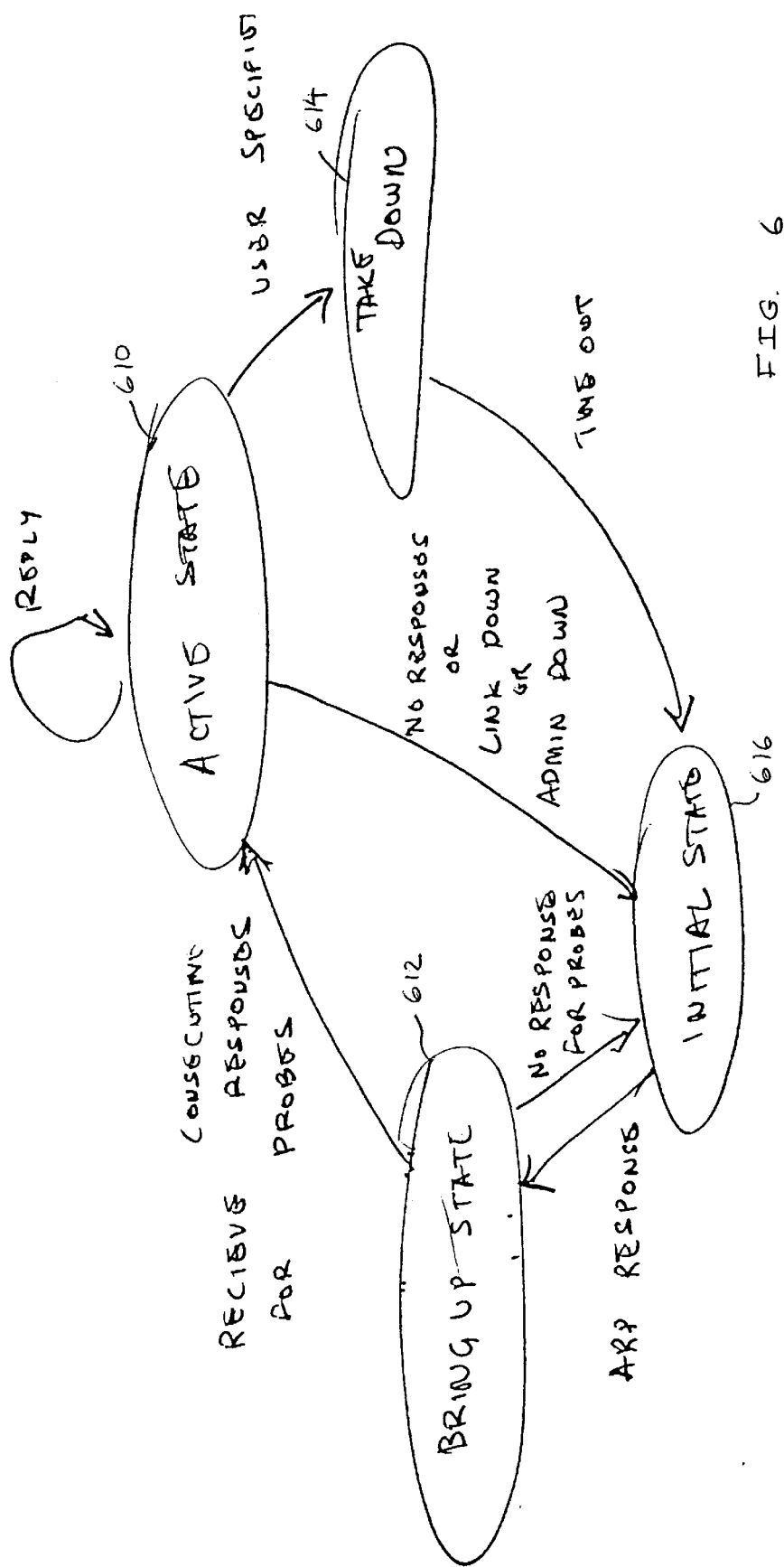
FIG. 6 is a schematic state diagram showing operational states of a technique for distributing traffic using clustering.

Referring to FIG. 6, a schematic state diagram shows operational states of a technique for distributing traffic by using clustering. In an Initial State 616, routers or firewalls in a cluster are inactive and no messages are routed between the servers and clients. A cluster is configured in the Initial State 616. The Initial State 616 is receptive to ARP probe methods for monitoring the routers in the firewall cluster. An ARP response while in the Initial State 616 causes a state transition to a Bring-Up State 612. In the Bring-Up State 612, the receipt of consecutive responses to ARP probes causes a transition to an Active State 610. If no responses for ARP probes are received, the state transitions from the Bring-Up State 612 back to the Initial State 616. In the Active State 610, regular replies are made to the ARP probes while active traffic distribution takes place.

Several conditions terminate the Active State 610. If no responses for ARP probes are received, the state transitions from the Active State 610 to the Initial State 616. Similarly, termination of a link or an administrator request to terminate the Active State 610 cause the Active State 610 to transition to the Initial State 616. A user-specified command causes the Active State 610 to transition to a Take-Down State 614 which, in turn, transitions to the Initial State 616 upon the occurrence of a time-out.

Figure 7:
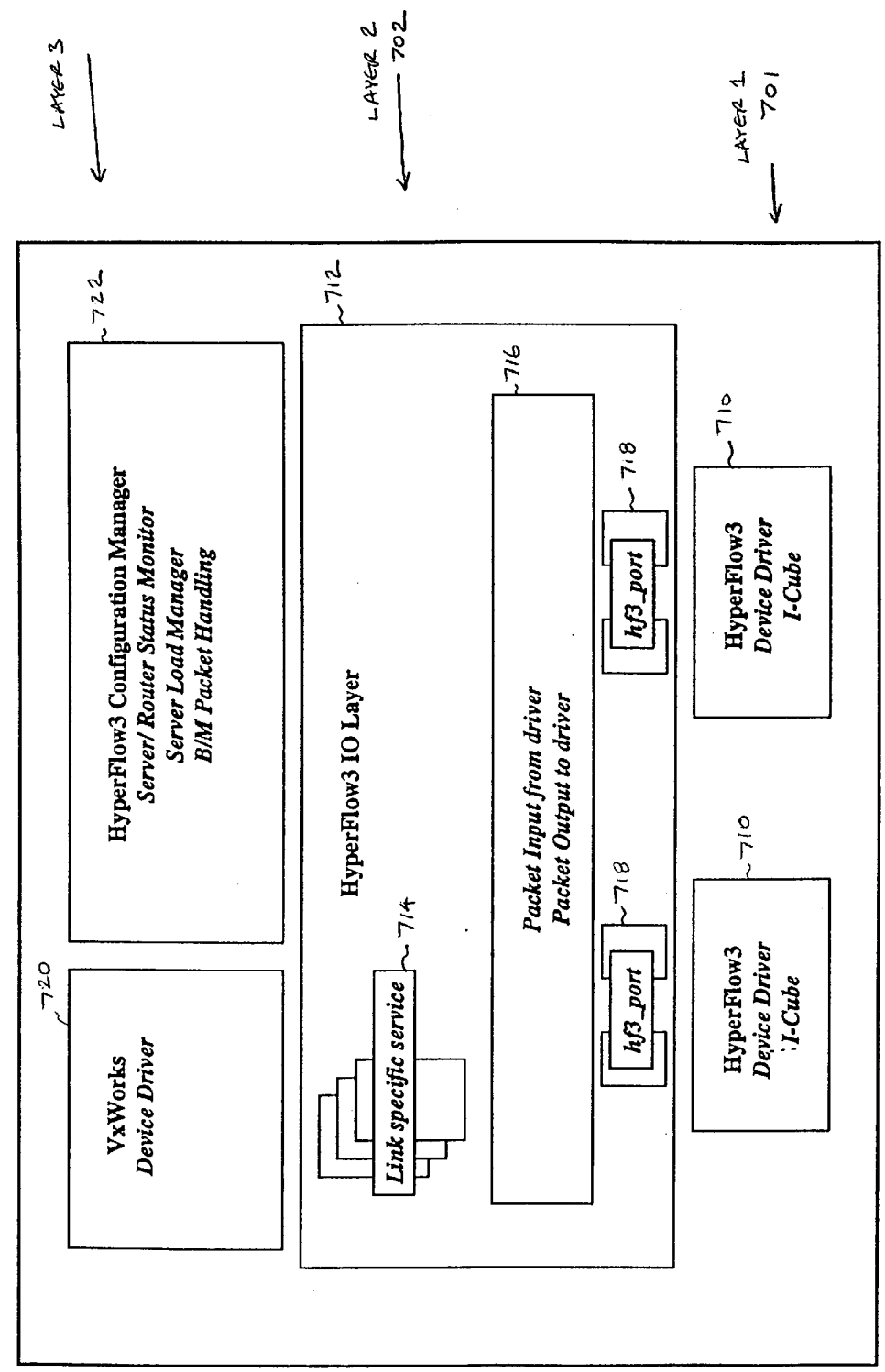
FIG. 7 is a schematic block diagram showing a system architecture including an arrangement of packet-forwarding layers for a packet-forwarding software module.

Referring to FIG. 7, a schematic block diagram shows a system architecture including an arrangement of packet-forwarding layers for a packet-forwarding software module 700. The packet-forwarding module defines clustering functionality and interfaces for either firewall clusters or router clusters. Packet-forwarding software executes on a commercial processor in combination with a commercially-available switching chip-set. The packet-forwarding software executes in conjunction with load-balancing software.

A suitable load-balancing software is described in co-pending application Ser. No. 08/992,038, now U.S. Pat. No. 6,601,084, entitled "Dynamic Load Balancer for Multiple Network Servers". It uses hashing to separate data requests from clients into a plurality of buckets to consistently balance the load on a plurality of servers. Buckets are dynamically assigned to the server having the lightest load, as necessary. The load balancer tracks the state of each server. A server is in the non-operational state if deemed unable to perform the service. The load balancer maintains a list of operational servers and assigns load only to servers that are operational. A server fault-tolerance mechanism in the load balancer detects when a server goes down and redistributes the load to the new set of operational servers.

When a previously non-operational server becomes operational, traffic is redistributed over the new set of operational serves. Redistribution does not disrupt existing client-server connections.

The packet-forwarding software supports several aspects of operation, including switching, high availability, fault-tolerance, clustering, and Ethernet switching.

At a base level, the packet-forwarding module 700 has device drivers 710 in a layer-1 701. In a layer-2 702, an IO layer 712 overlies the device drivers 710, and includes a link-specific service 714 and packet communications 716, including packet input from a driver and packet output signals to the driver. The IO layer 712 communicates with the device-driver layer-1 710 via ports 718. In a layer-3 703 overlying the IO layer 712 are a VxWorks Device Driver 720 and a configuration manager 722 that supports various functionalities including server/router status monitoring, server load management, and bill-of-material packet handling.

Packet forwarding occurs when a network flow controller receives a packet from a specific port and the packet is destined for a device on a network. Flow is controlled based on the port type of the port at which traffic is received and by the layer-3 Internet protocol (IP) address of the destination. The module receives a packet from one device driver and forwards the packet to another device driver. A separate Service Access Point (SAP) is defined by the packet-forwarding software and identifies each port. The packet-forwarding module includes a plurality of forwarding handlers including a handler for packet forwarding for Network Port types, and an IO layer Applications Programming Interface (API). The packet-forwarding software interfaces to modules including a server/cluster software module, a router/pool software module, a bucket state machine, and a traffic-distribution module.

The packet-forwarding module receives packets from a device driver of the network flow controller and forwards the received packets to another device driver. The type of service that a packet receives is based on the type of link. Link types include server, router, and network types.

Router and firewall clustering functionality supports scaling of routers and firewalls without having to reassign default gateways and static routes to any node in a subnet behind the router or firewall. All nodes in a LAN can use one gateway layer-3 703 address, and the network flow controller will distribute the traffic to different routers/firewalls in the cluster, attaining high-availability and fault-tolerance.

For firewalls, additional support manages a flow state using "sticky" connection features. The network flow controller supports multiple router/firewall clusters, in one illustrative configuration up to four. Network objects in a LAN use the router/firewall cluster as a default gateway to connect to additional networks. The network flow controller assumes that the router/firewall cluster has forwarding knowledge for the connections. Traffic sent to a layer-2 702 address is forwarded to the specific router/firewall depending on the load on the routers/firewalls in the cluster.

The packet-forwarding software includes a plurality of major functions including a "port handler initialization" function, a "packet-forwarding IO layer" API, a "packet-forwarding packet form Network type port" function, and a "packet-forwarding to Cluster handler" function. Other functions include a "get aggregate flow channel (bucket)" function, a "get IP address to determine load balancing" function, a "packet-forwarding packet to pool member" function, and a "packet-forwarding packet to forwarding member" function.

The packet-forwarding module port handler initialization function initializes the port function handlers and sets the port type. The packet forwarding module port handler initialization function has a synopsis of fwd_setPortType (port_t, *pszPort, int type) and includes two parameters, a port_t pointer to the port parameter and an int_type designator of a type to which the port is set. One implementation of the port handler initialization function is as follows:

```
If( port is NETWORK)
{
    switch(port type)
    {
        case SERVER:
            decrement object count on the port;
            break;
        default:
            break;
    }
}
switch( port type)
{
    case SERVER:
        set type to SERVER;
        increment object count on the port;
        set link handler to pf_inputPacketFromServerPort( );
        break;
    case ROUTER:
        set type to ROUTER;
        increment object count on the port;
        set link handler to pf_inputPacketFromRouterPort( );
        break;
    default:
        if (server object count and router object count is 0) {
        set type to NETWORK;
        set link handler to pf_inputPacketFromNetworkPort( );
        break;
}
```

The packet-forwarding IO layer API is a function that handles incoming packets and has a synopsis fwd_inputPacket (cookie_t *pCookie, data_t *pszData). The parameters include Cookie_t that identifies a port cookie from the driver and a data_t pointer to the data. The packet-forwarding IO layer API defines local and global variables, validates the port header size, validates the source port, gets the system run mode and required parameters, and gets the packet type from the data. In an illustrative system, the packet-forwarding IO layer API function operates as follows:

```
Switch (type)
{
    case ETHER_TYPE_IPV4:
        call the link handler to process IP packet;
        break;
    case ETHER_TYPE_ARP:
        call the ARP input handler
        break;
    default:
        if (Multicast packet)
            Broadcast to all ports except port it came on
        Else
            Send packet to the MAC address from the table
        Break;
}
```

The packet-forwarding packet from Network type port function is a function handler for a packet coming in on a Network type port and has a synopsis of fwd_inputPacketFromLinkType. Parameters of the function include a port_t Pointer to the port, and a data_t Pointer to the data. The packet-forwarding packet from Network type port function defines and/or initializes local and/or global variables, then gets the destination IP address from the data.

Pseudocode describing operation of the packet-forwarding packet from Network type port is as follows:

```
if (destination is one of our clusters)
{
    call the cluster handler;
    return;
}
if (destination is the operating system)
{
    if (source port is a firewall type port)
    {
        if (packet is an ICMP packet)
        {
            if (group=fwdGetGroupFromPeerIP(port, data))
            {
                ICMP peer IP Handler
                Return;
            }
        }
        if (system access is not disabled)
        {
            queue packet for the operating system;
            return;
        }
        if (packet is Multicast)
        {
            Create duplicate packet and Queue to operating system;
            Broadcast packet to all port except for it came in on.
            Return;
        }
        if (Check for pool member by MAC address)
        {
            if (Router redirection set)
            {
                call the redirection handler;
                return;
            }
            /* Check for Router Fault Tolerance */
            if (pool Group is not null and pool Group forwarding set)
            {
                call Pool fault tolerance handler (fwd_poolMemhndlr( ));
                return;
            }
        }
        if (router type cluster or firewall type cluster)
        {
            call cluster handler;
            return;
        }
    }
}
Free data;
return;
```

The packet-forwarding to Cluster handler function that handles forwarding of packets to the cluster and has a synopsis Void fwd_toClusterHandler (CLUSTER_T *pCluster, DATA_T *pData, PORT_T *pPort). The parameters include a Cluster t pointer to the cluster data, a Port_t pointer to the port, and a Data_t pointer to the data. The packet-forwarding to Cluster handler function defines and/or initializes local and/or global variables. In an illustrative system, the packet-forwarding to Cluster handler function operates as follows:

```
if (a redirection member record is included)
{
    update the L2 address;
    send packet to the destination server;
    return;
}
```

Following the function, the packet is sent to the router/firewall in the cluster. The function gets the bucket for the flow based on the cluster group type and executes the bucket state machine.

The get aggregate flow channel (bucket) function returns the pointer to the aggregate flow, which is also called the bucket, for the cluster. The get aggregate flow channel (bucket) function has a synopsis of BUCKET_T *getAggregateFlowChannel (DATA_T *pData, PORT_T *pport, CLUSTER_T *pCLuster, UINT32_T *puiIndex). The parameters include a Cluster_t pointer to the cluster data, a Port_t pointer to the port, a Data_t pointer to the data, and a UINT32 reference pointer to the bucket index. The function returns BUCKET_T*. The get aggregate flow channel (bucket) function defines and/or initializes local and/or global variables and then gets the layer-3 address based on the cluster group type. The function gets the aggregate flow index from the IP address and returns the pointer to the bucket.

The get IP address to determine load balancing function returns the layer-3 address which determines the load-calculating variable. The get IP address to determine load balancing function has a synopsis of UINT32 ipv4_loadDeterminationAddr (DATA_T *pData, PORT_T *pPort, CLUSTER_T *pCluster). The parameters include the Cluster_t pointer to cluster data, the Port_t pointer to the port, and the Data_t pointer to the data. The function returns a UINT32 IP address. The get IP address to determine load-balancing function is described by pseudocode as follows:

```
switch (Cluster Get Group Type)
{
case CROUTER:
    return destination IP address from the packet.
Case CFIREWALL:
    switch (get firewall zone)
    {
    case FIREWALL_INTERNAL:
        return destination IP address from the packet.
    case FIREWALL_EXTERNAL:
        return source IP address from the packet.
    case FIREWALL_NONE:
    default:
        return sum of source and destination IP address from packet.
    }
case CSERVER:
case CVPN:
default:
    return source IP address from the packet.
}
```

A packet-forwarding packet to pool member function is a handler for pool member redirection and router/firewall pooling and has a synopsis of Void fwd_toPoolMemberHandler (VMEMBER_T *pMember, PORT_T *pPort, DATA_T *pData). The parameters include a Vmember_t pointer to member data, a Port_t pointer to the port, and a Data_t pointer to the data. The function returns Void. The packet-forwarding packet to pool member function defines and/or initializes local and/or global variables, then functions according to the following pseudocode:

```
if (member redirection to a cluster exists)
{
    forward to a cluster handler;
    return;
}
else
{
    forward packet to forwarding router;
    return;
}
```

A packet-forwarding packet to forwarding member function forwards traffic to the forwarding member. The function has a synopsis of Void fwdPacketToForwardingMember (VMEMBER_T *pMember, DATA_T *pData). The parameters include a Vmember_t pointer to the member data and a Data_t pointer to the data. The function returns Void. The packet-forwarding packet to pool member function first defines and/or initializes local and/or global variables, then initializes the original member and gets the pool from the member data. The function pseudocode is, as follows:

```
if (member found forwarding member in pool)
{
    copy the layer-2 address from the member data into data;
    send packet to the link from the member data;
    return;
}
else
{
    if (send packet to original member failed)
    {
        freedata;
    }
    return;
}
```

Figure 8:
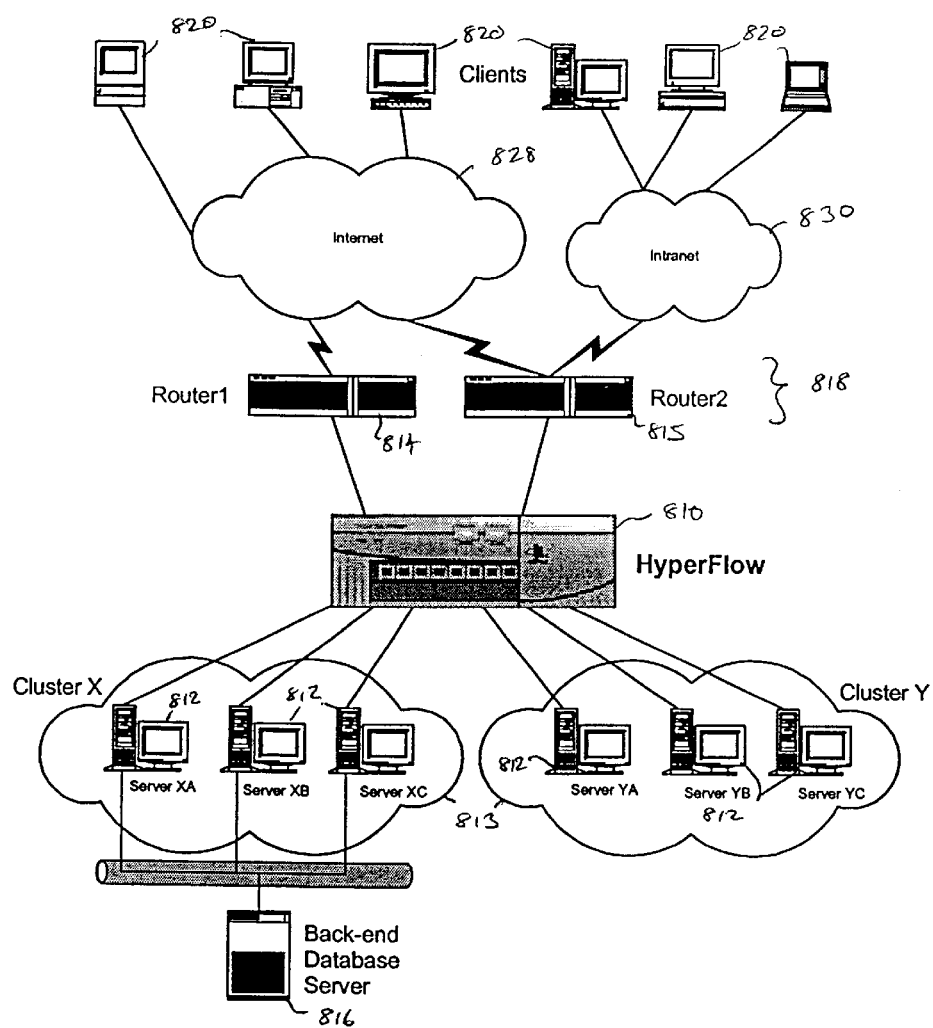
FIG. 8 is a schematic block diagram showing an example of a clustering system within a network topology.

Referring to FIG. 8, a schematic block diagram shows an example of a clustering system and network flow controller 810 within a network topology 800. The example shows a network flow controller 810 that arranges system elements into clusters at stages of communication flow from servers to clients. The network flow controller 810 is connected to a plurality of servers 812 and arranges the plurality of servers 812 into server clusters 813, including a cluster X and a cluster Y. In the illustrative example, servers 812 in the cluster X are interconnected to a back-end database server 816. The network flow controller 810 is also connected to Firewall1 814 and Firewall2 815 and arranges the two routers into a firewall cluster 818. The routers are connected to one or more networks such as an Internet 828 and an Intranet 830. The networks are further connected to clients 820.

In an illustrative system, a network flow controller 810 is available with 8 or 16 auto-negotiating Fast Ethernet ports to supply a high-speed interconnect for server-server and client-server communication.

The network flow controller 810 attains high-availability through fault-tolerance. Within the network flow controller 810, dual power supplies and intelligent fans ensure that operation continues even under adverse environmental operating conditions. Two or more network flow controllers 810 may be linked for redundancy that eliminates a single point of failure within the cluster. Multiple network flow controllers 810 can cooperate in an active-standby or active-active fail-over mode. The network flow controllers 810 can exchange heartbeat and configuration information over a dedicated Fast Ethernet port.

The network flow controller 810 intelligently distributes Internet protocol (IP) traffic across multiple replicated servers 812. The network flow controller 810 uniquely identifies a group of replicated servers 812 by a single IP address. Traffic destined for the cluster IP address is distributed across the servers 812 within the server cluster 813 by the network flow controller 810. All clients 820 accessing the servers 812 are presented only the cluster IP address, with the presence of the plurality of replicated servers 812 and the identity of the specific server to which the traffic is forwarded within the cluster hidden.

In the illustrative system, the network flow controller 810 configures two server clusters 813, Cluster X and Cluster Y, with a plurality of servers 812 associated with each cluster 813. Cluster X has three servers 812: Server XA, Server XB, and Server XC, that supply access to a back-end database server 816. Cluster Y also has three servers: Server YA, Server YB, and Server YC. Two routers, Firewall1 814 and Firewall2 815, supply access to the servers 812 over an Intranet 830 and an Internet 828. A potentially-large number of clients 820 access the servers 812 through the routers.

The servers 812 in Cluster X are individually capable of supplying the same set of services to clients. The Cluster X servers 812 are 'front-ends' for a shared server which maintains data synchronization. The clients 820 view any server 812 within the cluster as being capable of processing requests. The network flow controller 810 groups functionally similar servers 812 in a cluster to distribute a load from the clients 820 amongst the plurality of servers 812.

The servers 812 in Cluster Y may perform an entirely different set of services for clients 820. In one example, the servers 812 in cluster Y are independent replicated servers with timing connections to maintain data synchrony. From the perspective of clients 820, any server within cluster Y is capable of processing requests. The network flow controller 810 fits into a network topology between a router and the servers. From the perspective of network flow controller 810, ports that connect to the servers 812 are known as Server Ports. The network flow controller 810 ports that connect to the routers are called Router Ports.

Each server has a unique IP address, called a server management address, which can be used for administration purposes. Servers within a cluster also share a same 'logical' IP address, called a cluster IP address. Clients 820 direct requests to the cluster IP address, not to a server management address.

The network flow controller 810 uses Proxy ARP to indicate to attached routers that the MAC address of the network flow controller 810 should be used when sending packets to any of the configured cluster IP addresses. The network flow controller 810 responds to ARP request for the cluster IP address by sending the network flow controller 810 MAC address, ensuring that all traffic destined for the servers 812 within a cluster is sent to the network flow controller 810 by the routers.

When network flow controller 810 receives a packet from a router, the destination IP address determines the cluster for which the packet is targeted, and the source IP address determines the server within the cluster to which network flow controller 810 will forward the packet.

When a packet arrives from a new client, i.e., a client having a source IP address that is not yet mapped, network flow controller 810 associates the client with the least-loaded server at the time of arrival.

A "static" association exists between a client source IP address and the server within a cluster that processes packets from the client. In the static association, once the association is configured, the association remains for subsequent packets from the same source. A common term for the static association is a flow. The flow between the selected server and the source IP address is timed. While traffic continues to arrive from the source IP address destined for the cluster IP address, the association remains valid. If the traffic from the source IP address to the cluster IP address stops for more than a selected period, the association terminates. Internal to network flow controller 810, a hash table stores flow information. A has table maps a large set of values into a much-smaller set, so that two different source IP addresses may be mapped to the same table entry. When multiple IP addresses are mapped to the same table, the source IP address that arrives later uses the same association as was set by the first source IP address, even through the flow is distinct and different. The hash table permits aggregation of flows. As new flows arrive, the new flows will either create new associations if the mapped hash entry is unassigned, or the new flows use previously configured associations if the mapped hash entry is already assigned. The network flow controller 810 maintains a separate hash table for each cluster.

Network flow controller 810 continually monitors the servers 812 to detect non-operational conditions. If a servers 812 within a cluster fails, network flow controller 810 reassigns all hash-table entries that are associated with the failed server to other servers within the cluster.

Routers send packets destined for the cluster IP addresses to network flow controller 810. The packets have a destination MAC address associated with network flow controller 810, and a destination IP address associated with the cluster. Once network flow controller 810 has determined which server is to receive forwarded packets, the network flow controller 810 replaces the destination MAC address to identify the selected server and sends the packet via the interface to which the server is attached. The server has the same IP address as the cluster IP address; no change is made to the packet IP header or payload.

For network traffic in the opposite direction, from the server 812 back to a client 820, network flow controller 810 simply forwards the MAC or IP header to the router without modification. The network flow controller 810 does not modify the MAC or IP header of the packets, and the packets are forwarded by the network flow controller 810 switches.

In addition to monitoring the operational state of the servers 812, network flow controller 810 similarly monitors the attached routers. If a router fails, network flow controller 810 intercepts packets destined for the failing router and rewrites the MAC destination address to address an alternative router. For example, if Firewall2 815 fails, then Firewall1 814 is used to ensure continued connectively to the Internet 828.

The network flow controller 810 intelligently distributes traffic by directing client traffic that is sent to a cluster IP address to specific servers within the cluster. The network flow controller 810 distributes traffic on a per-aggregated flow basis.

Traffic from any client having a source IP address that is mapped to a flow is sent to the assigned server. The network flow controller 810 rewrites the destination MAC address to the address of the assigned server, replacing the address of network flow controller 810. For each packet, network flow controller 810 determines the cluster to which the packet is targeted and the assigned server for the source IP address. The network flow controller 810 then rewrites the destination MAC address to be the address of the assigned server and forwards the packet on the appropriate server port.

At any time, any number of clients can use the same flow. Network flow controller 810 does not normally keep any information, in terms of count or actual client IP addresses, that associates particular clients to a particular flow.

Association of a server with a particular collection of client IP addresses is timed. After a period of inactivity in which no packets are received from any clients mapped to that flow, the association is purged.

Potentially, each server within a cluster may have multiple IP addresses. One of the server IP addresses must be the address of the cluster to which the server is associated. The server may have other IP addresses, used for management and administration purposes. The network flow controller 810 does manage traffic for the server management IP addresses. Traffic management is only performed on traffic destined for the cluster IP address. Traffic destined for server management IP addresses is handled by switches within network flow controller 810, and is not processed by the processor in the network flow controller 810.

When a large number of clients 820 may be accessing the servers 812 through a proxy server, network flow controller 810 more evenly distributes traffic. The network flow controller 810 can be configured to include a TCP source port number in packet information used to distribute traffic. When enabled, the traffic distributor, which is configurable on a per-cluster basis, identifies a flow by using the packet source IP address, destination IP address and, if available, the TCP source port number. Non-TCP traffic continues processing using Layer-3 information including source and destination IP addresses, and is not affected by the traffic distributor.

The network flow controller 810 implements traffic-distribution methods that allow an administrator to tune the traffic management. The network flow controller 810 selects a server when a flow from a client arrives which was not recently assigned to a server. The network flow controller 810 supports a plurality of traffic-distribution methods including round-robin, least-used flow, and weighted methods.

In the round-robin method, network flow controller 810 simply steps through the servers in the cluster and selects the next one in sequence regardless of actual server loads. Servers are held in a circular list structure, with position determined by the order of configuration.

In the least-used flow method, network flow controller 810 selects the server that has been forwarded the least amount of traffic from clients. Return traffic from the server is not considered in the determination.

In the weighted method, network flow controller 810 selects the least-loaded server within the cluster based on the user-assigned server weight and the measured server load.

Session persistence continues to be maintained for all traffic-distribution methods.

The network flow controller 810 determines server loads by using a variety of techniques in two general categories, non-intrusive and intrusive. In the non-intrusive techniques, the server-load metric is independent of the server, operating system, and hardware platform. Non-intrusive techniques use information from sources external to the server. Two non-intrusive server-load metrics are probe response-time and network-utilization metrics.

In the probe response-time metric, the network flow controller 810 tracks the time to probe a server and is available regardless of the number of servers configured on the port.

Network-utilization metric involves tracking the amount of data transferred between network flow controller 810 and the server in terms of packets and bytes sent and received in both directions. Network utilization can only be used when a single server is configured on the port.

The intrusive category of server load metric employs the administrator to install software on the server, and has the advantage of accurately determining the load based on internal server information. The software component that loads onto the server is called a server agent. The server agent calculates the load based on CPU utilization. Windows NT and UNIX server platforms are supported.

The administrator configures the server load-determination method based on the server operating environment.

The network flow controller 810 arranges servers 812 into clusters. Granularity of the traffic distribution performed by network flow controller 810 is configurable by the administrator. In an illustrative system, by default network flow controller 810 holds information for 1024 aggregated flows for each cluster and supports a maximum of 64 such clusters.

For administrators having a requirement for traffic distribution to occur with a finer granularity, network flow controller 810 may be configured to hold information for up to 16384 aggregated flows. Using fine granularity, network flow controller 810 supports a maximum of 4 clusters.

In situations where the number of supported clusters is important, network flow controller 810 can be configured to support a maximum of 1024 clusters with no more than 2048 servers total, each holding information for 64 aggregated flows.

Each cluster is assigned a unique IP address. The same IP address is also assigned to each server within that cluster. The network flow controller 810 does not perform IP address translation as part of traffic-distribution techniques.

Graceful server takedown introduces the concept of secondary flows. Normally, a flow is designed to supply all IP addresses that map to the assigned server. A secondary flow is designed for a specific IP address only. Secondary flows exist only during graceful take-down of a server. During normal server operation, secondary flows do not exist. Secondary flows can be considered as branching off, as a linked-list, from an associated cluster flow. Only flows within a cluster that are affected by a server takedown have associated secondary flows. The number of secondary flows associated with a cluster flow depends on the number of different IP addresses that are mapped into the flow within a given period. For cluster flows that are mapped to only a small number of IP addresses, the length of the secondary flow list is small. The available runtime resources determine the upper limit on the number of secondary flows.

The network flow controller 810 permits the administrator to configure and connect multiple servers 812 per port, permitting usage in an environment with a larger number of servers without "stacking" multiple units. A single network flow controller 810 unit, or a pair when used in a fail-over topology, can cluster a large number of servers. Multiple server configuration exploits the "all/IP" technology used in network flow controller 810.

The network flow controller 810 avoids usage of Network Address Translation (NAT) and NAT's inherent performance penalties and interoperability drawbacks by aliasing the interface IP address on the server. Aliasing of the cluster IP address on the server IP loopback interface allows a server to belong to many clusters and reside on the same LAN segment as other servers, even other servers that belong to the same cluster, without creating problems from duplication of IP addresses.

In an illustrative implementation, the network flow controller 810 supports up to 1024 clusters with up to 2048 total servers. No restriction is imposed on the number of servers on a single port so long as the total number of configured servers in the system does not exceed the imposed overall limit.

The network flow controller 810 allows an administrator to configure a number of "hot-standby servers" within the cluster most effectively for high-availability conditions with no possibility of server replication. The network flow controller 810 forwards traffic only to operational non-hot-standby servers in a cluster until the traffic exceeds the capacity of the non-hot-standby servers. Hot-standby servers remain idle, although the network follow controller 810 does execute health-monitoring of the idle hot-standby servers. Once the capacity of the non-hot-standby servers is exceeded, network flow controller 810 selects a hot-standby server to forward cluster traffic for processing. In an illustrative implementation, network flow controller 810 selects hot-standby servers in a round-robin order based on the order of configuration.

The network flow controller 810 also controls traffic to direct specific types of traffic exclusively to one or more dedicated servers in a cluster. A dedicated server is a server that, though replicated, performs a unique service that is not offered by other servers. In one example of an implementation, an administrator can configure up to five different port numbers and respective associated servers in the cluster. The network flow controller 810 only forwards traffic of the defined types to the specified dedicated server regardless of server loads.

The network flow controller 810 supports application probes. Application probes allow an administrator to control analysis of the network flow controller 810 in determining health of servers within a cluster. The administrator completely controls techniques for testing the cluster and defining a standard for a good response.

The network flow controller 810 supports an application probe for the HTTP server. At regular intervals defined by a preset "keep-alive" interval, network flow controller 810 issues a GET request to the management IP address assigned to the server. The administrator typically configures the application probe according to port, requested URL, and response codes that are not indicative of an error condition.

The network flow controller 810 also supports an application probe that uses only ARP requests and replies. At regular intervals, defined by the "keep-alive" interval, network flow controller 810 issues an ARP Request to the server.

The network flow controller 810 is generally located at a key position within a network topology and is well-suited to enforce policies including traffic redirection. The network flow controller 810 can direct traffic to Proxy Servers that cache the contents of frequently-accessed web pages locally, improving response time to a web-browser user and freeing expensive (WAN) network bandwidth for the network administrator. Proxy Server operation is both disk and CPU intensive, so that Proxy Servers are prime candidates for clustering. Effectiveness of a Proxy Server is proportional to usage. Users must configure the web browser to directly interact with the Proxy Servers rather than accessing a web-site directly. When the administrator cannot enforce a user's voluntary use of Proxy Servers, network flow controller 810 can be used to transparently redirect HTTP traffic to a Proxy Server without the user configuring the webbrowser. Redirection is applied to traffic originating from network-type ports, not server or router ports, and is destined for user-configured router IP addresses.

The network flow controller 810 not only controls HTTP Redirection, which is a well-understood and accepted concept, but also controls redirection for other types of IP traffic. IP Redirection is applied to traffic originating from network-type ports, not server or router ports, and is destined for user-configured router IP addresses.

The network flow controller 810 implements server faultintolerance within a cluster by periodically checking individual servers within a cluster to ensure that the servers are operational. At regular intervals, e.g., a selectable "keepalive" interval, network flow controller 810 sends application probes to each server and waits for a reply. If a server does not respond to a selectable down-count number of consecutive application probes, the server is classed within a "down" condition.

Whenever a server fails to respond to an application probe, network flow controller 810 uses other servers within the cluster to handle any assigned flows. Network flow controller 810 reassigns any flows that are currently assigned to the server to the most suitable servers within the cluster. Active client-server sessions using the server are affected.

Even while a server is down, network flow controller 810 continues to send applications probes to ensure detection of the server upon recovery. A selectable "bring-up" count number of consecutive replies is received before network flow controller 810 marks the server as up again. When a failed server is again usable, network flow controller 810 does not automatically reassign any previously-assigned flows that would adversely affect any active client-server sessions. The again-usable server, probably the least-loaded in the cluster, is used only in new flow assignments.

The network flow controller 810 implements router faulttolerance through usage of router pools. A cluster is considered to be a group of functionally-equivalent servers. Similarly, a router pool is a group of route-equivalent routers. All routers within a router pool can route packets to the same destinations, although routing paths may vary. For example, one router in a pool may have access to a dedicated leased-line connection. Another router may use a dial-up connection.

The network flow controller 810 periodically checks routers in a pool to ensure an operational condition. Two techniques for detecting the operational state of routers are the Address Resolution Protocol (ARP) and ICMP Router Discovery Protocol (IRDP).

The network flow controller 810 implements ARP by sending, at regular intervals, ARP Request packets to each router in the pool, then waiting for a reply. If a router does not respond to a down-count number of consecutive ARP Requests, a router is marked as down. While a router is down, network flow controller 810 continues to send ARP Requests to the inoperative router. A "bring-up" count number of consecutive replies is received before network flow controller 810 marks the router as up again.

Routers periodically multicast ICMP Router Advertisement messages advertising interface addresses. The network flow controller 810 implements IRDP by detecting the advertisement messages and recording the message receipt time and the TTL value for each router address included in the messages. The router is considered to be down if a second ICMP Router Advertisement is not received fore the TTL elapses. The network flow controller 810 does not transmit any ICMP Router Solicitation messages, but simply waits for the messages, possibly extending the time for determining whether a router is operational.

Router fault-tolerance allows servers to retain network connectivity without reconfiguration. The servers are not directly affected when outbound traffic is redirected by network flow controller 810 to an alternative, but routeequivalent, router. While the routers are operational, network flow controller 810 directs switches to perform packet forwarding from the servers to the routers. The network flow controller 810 does not process the packets. When network flow controller 810 detects that a router has failed or is informed by the administrator that a router is down, network flow controller 810 redirects any packets received from the servers and bound for the failed router to another router in the pool. Redirection occurs at Layer-2. The network flow controller 810 rewrites the destination MAC address of any packet that is meant for the inoperative router. The replacement destination MAC address is the MAC address of another router from the router pool. If no operational routers remain within a router pool, network flow controller 810 discards the traffic.

The network flow controller 810 determines which router replaces a failed router by simply choosing the first operational router within the pool. The network flow controller 810 contains no configurable weightings for routers to indicate usage preference. All routers are treated equally.

When an inoperative router becomes operational again, network flow controller 810 stops redirecting the traffic to the other router from the pool. The network flow controller 810 returns to using ordinary switching to forward packets to the router. The network flow controller 810 then terminates packet processing.

The network flow controller 180 uses Proxy ARP to effectively "hide" servers within a cluster. The network flow controller 810 ensures that devices connected to the Router Ports interact with the proxy rather than directly with the servers for any cluster-related activity.

Network flow controller 810 uses Proxy ARP to ensure that packets destined for any of the cluster IP addresses are sent to network flow controller 810 rather than directly to the servers within the clusters. When a router attempts to send a packet to a cluster but is not informed of the destination MAC address, the router sends an ARP Request packet requesting a station with the IP address indicated in the ARP Request packet to reply with station MAC address. The network flow controller 810 responds to an ARP Request packet with a cluster IP address received on a Router Port by sending the MAC address of the network flow controller 810. The router then uses the network flow controller 810 MAC address when sending packets for the cluster IP address. The network flow controller 810 receives all traffic from Router Ports directed at clusters.

When a server attempts to send a packet to a particular destination IP address on the same subnet but does not have the appropriate destination MAC address, the server sends out an ARP Request packet. The network flow controller 810, on receiving an ARP Request from a server, intercepts the ARP Request. The network flow controller 810 modifies the ARP Request source information, including MAC and IP addresses, such that the information appears to have been sent by network flow controller 810 rather than by one of the servers. The modified ARP Request is then broadcast. Upon receiving a reply, network flow controller 810 modifies the ARP Reply destination information, including MAC and IP addresses. A copy of the ARP Reply is sent back directly to each server within the cluster.

If network flow controller 810 receives an ARP Request from a server for a failed router, network flow controller 810 replies back with the MAC address of an alternate operational router from the pool. The server functions as though the failed router is operational, and sends traffic to the alternate router.

Some servers use ARP to detect duplicate IP address assignments upon power-up. The servers send ARP Request packets requesting a response from the host with the same address. No reply is received if the server IP address is unique within the sub-network. The network flow controller 810 ensures that a server in a cluster does not detect other servers within the cluster. The network flow controller 810 discards any ARP Request packet that originated from a server; for example, the source IP address is the address of the cluster, and is targeted to the cluster IP address or any server management IP address.

Network flow controller 810 supports two fail-over modes of operation to eliminate single points of failure, including an active-standby mode and an active-active mode. In active-standby mode, an active network flow controller (A) has a hot standby network flow controller unit (B) constantly monitoring health and status of the A unit. The standby network flow controller unit (B) is able to take over in less than 10 seconds, after detecting a failure. The active-standby fail-over solution fits easily into an existing network topology. The administrator need not change network interface cards, server configuration, cables, router configuration, or software to employ a hot-standby fail-over solution.

Active-Active mode is used for applications where high availability is paramount. Though sessions will be disrupted during a router/flow controller/server failure, no single failure affects server availability.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

In the claims, unless otherwise indicated, the article "a" is to refer to "one or more than one".

What is claimed is:

1. A method of managing message traffic between an interior network and an exterior network in conjunction with a plurality of firewalls securing the interior network from intrusion from the exterior network, the method comprising:

creating a firewall cluster containing a plurality of the firewalls, the firewall cluster being addressed by a logical Internet protocol (IP) address that is distinct from unique IP addresses of firewalls contained within the firewall cluster, and further being addressed by an associated media access control (MAC) address that is distinct from unique MAC addresses of the firewalls contained within the firewall cluster;

in response to a packet addressed to the logical IP address or the associated MAC address, a flow controller that is distinct from the firewalls contained in the firewall cluster selecting a firewall from among the firewalls contained in the firewall cluster on a basis of information in a header of the packet;

in response to the selecting, the flow controller addressing the packet to the MAC address of the selected firewall; and in response to the addressing, the flow controller sending the packet to the selected firewall for transferring the packet between the interior network and the exterior network via the selected firewall.

2. A method according to claim 1 wherein the creating operation further comprises:

configuring peer flow controllers one for controlling the firewalls in the interior network and another for controlling the firewalls in the exterior network from across an interior-exterior network boundary; and probing the peer controllers through the firewalls in the interior network and the firewalls in the exterior network across the interior-exterior network boundary.

3. A method according to claim 2 further comprising:

monitoring health of the firewalls via the probing.

4. A method according to claim 1 wherein the creating operation further comprises:

configuring peer flow controllers one for controlling the firewalls in the interior network and another for controlling the firewalls in the exterior network from across an interior-exterior network boundary; and probing the peer controllers across the interior-exterior network boundary using Ping packets.

5. A method according to claim 1 wherein:

selecting the firewall comprises identifying a client-server flow based on a source and a destination IP address of the packet and a port; and selecting the firewall based on the identified client-server flow to transfer all of the packets of the identified client-server flow via same said selected firewall.

6. A method according to claim 1 wherein:

selecting the firewall comprises when the firewalls perform packet filtering and do not perform network address translation (NAT), selecting the firewall based on a source and a destination IP address and a port.

7. A method according to claim 1 wherein:

selecting the firewall comprises when the firewalls perform network address translation (NAT), using a packet source IP address to select the firewall for packets of traffic inbound to the interior network, and using a packet destination IP address to select the firewall for packets of traffic outbound to the exterior network.

8. A method according to claim 1 further comprising:

monitoring health of the firewalls by sending Ping packets through individual said firewalls; and testing operational state of the individual firewalls and internal and external links.

9. The method of claim 1 further comprising:

in response to an address resolution protocol (ARP) request, the flow controller responding with the MAC address associated with the firewall cluster, wherein:

the associated MAC address comprises a MAC address of the flow controller.

10. The method of claim 9 wherein:

the flow controller has its own unique IP address distinct from the logical IP address and the unique IP addresses of the firewalls.

11. The method of claim 1 wherein:

each firewall comprises a different interface of one or more firewall routers.

12. A method of managing message traffic between an interior network and an exterior network in conjunction with a plurality of firewalls securing the interior network from intrusion from the exterior network, comprising:

creating an internal firewall cluster containing a plurality of the firewalls which are in the interior network, the internal firewall cluster being addressed by a first logical Internet Protocol (IP) address that is distinct from unique IP addresses of the firewalls contained within the internal firewall cluster, and further being addressed by a first associated media access control (MAC) address that is distinct from MAC addresses of the firewalls contained within the internal firewall cluster;

creating an external firewall cluster containing a plurality of the firewalls that are in the exterior network, the external firewall cluster being addressed by a second logical IP address that is distinct from unique IP addresses of the firewalls contained within the external firewall cluster, and further being addressed by a second associated MAC address that is distinct from MAC addresses of the firewalls contained within the external firewall cluster;

in response to a first packet outbound to the exterior network and addressed to the first logical IP address or the first associated MAC address, a first flow controller that is associated with the internal firewall cluster and that is distinct from the firewalls contained within the internal firewall cluster selecting a first firewall from among the internal firewall cluster on a basis of information in a header of the first packet;

in response to the selecting of the first firewall, the first flow controller addressing the first packet to the MAC address of the first firewall;

in response to the addressing of the first packet, the first flow controller sending the first packet to the first firewall for transferring the first packet from the interior network via the first firewall;

in response to a second packet inbound to the interior network and addressed to the second logical IP address or the second associated MAC address, a second flow controller that is associated with the external firewall cluster and that is distinct from the firewalls contained within the external firewall cluster selecting a second firewall from among the external firewall cluster on a basis of information in a header of the second packet;

in response to selecting of the second firewall, the second flow controller addressing the second packet to the MAC address of the second firewall; and in response to the addressing of the second packet, the second flow controller sending the second packet to the second firewall for transferring the second packet from the exterior network via the second firewall.

13. A method according to claim 12 further comprising:

configuring the first logical IP address as a default gateway; and configuring the second logical external firewall IP address as a next-hop gateway.

14. A method according to claim 12 further comprising:

detecting an address resolution protocol (ARP) request;

the first flow controller responding to the ARP request with the MAC address associated with the internal firewall cluster; and the second flow controller responding to the ARP request with the MAC address associated with the external firewall cluster.

15. The method of claim 12 wherein:

transferring the first packet comprises transferring the first packet from the interior network to the exterior network via the first firewall and a corresponding firewall in the external firewall cluster; and transferring the second packet comprises transferring the second packet from the exterior network to the interior network via the second firewall and a corresponding firewall in the internal firewall cluster.

16. The method of claim 15 wherein:

each client-server flow is transferred between the interior and the exterior network by a single firewall pair comprising a firewall in the external firewall cluster and a corresponding firewall in the internal firewall cluster.

17. A method according to claim 16 further comprising:

maintaining a list of operational said client-server flows.

18. The method of claim 16 wherein:

each selecting is based on a source IP address and a destination IP address in the header of corresponding said packet.

19. The method of claim 16 wherein:

selecting of the first firewall is based on a source IP address in the header of the first packet, and selecting of the second firewall is based on a destination IP address in the header of the second packet.

20. The method of claim 12 further comprising:

in response to an address resolution protocol (ARP) request, the first flow controller responding with the first MAC address and the second flow controller responding with the second MAC address, wherein:

the first MAC address comprises a MAC address of the first flow controller, and the second MAC address comprises a MAC address of the second flow controller.

21. The method of claim 20 wherein:

each flow controller has its own unique IP address distinct from the logical IP addresses and the unique IP addresses of the firewalls.

22. The method of claim 21 further comprising:

the flow controllers sending Ping packets to each other through the firewalls of both of the clusters to monitor health of the firewalls.

23. The method of claim 12 wherein:

each firewall comprises a different interface of one or more firewall routers.

24. At least one computer-readable storage medium containing instructions which, when executed on at least one computer, cause the computer to function in the fashion of one of the claims 1, 2, 4, 5, 6, 7, 3, 8, 13, 14, 17 or 9, 10, 11, 12, 15, 16, 18, 19, 20, 21, 23, 22.

25. An apparatus for managing message traffic between an interior network and an exterior network in conjunction with a plurality of firewalls securing the interior network from intrusion from the exterior network, comprising:

a flow controller defining a firewall cluster containing a plurality of the firewalls, the firewall cluster being addressed by a logical Internet Protocol (IP) address that is distinct from unique IP addresses of firewalls contained within the firewall cluster, and further being addressed by an associated media access control (MAC) address that is distinct from unique MAC addresses of the firewalls contained within the firewall cluster, the flow controller being distinct from the firewalls contained within the firewall cluster and being responsive to a packet addressed to the logical IP address or to the associated MAC address by selecting a firewall from among the firewalls contained in the firewall cluster on a basis of information in a header of the packet, addressing the packet to the MAC address of the selected firewall, and sending the packet to the selected firewall for transfer of the packet by the selected firewall between the interior network and the exterior network.

26. The apparatus of claim 25 wherein:

the flow controller includes a state machine for distributing the traffic among the firewalls in the firewall cluster the state machine comprising an initial state within which elements of the firewall cluster are assigned a MAC address, the initial state being responsive to an ARP probe;

a bring-up state that is activated on a response to an ARP probe in the initial state; and an active state that is activated upon receipt of consecutive responses of the ARP probe.

27. The apparatus of claim 26 wherein:

the state machine further comprises:

a take-down state that is activated upon a user-specification while in the active state and transitioning to the initial state on a time-out signal.

28. The apparatus of claim 26 wherein:

the bring-up state transitions to the initial state upon lack of response to ARP probes.

29. The apparatus of claim 26 wherein:

the active state transitions to the initial state upon lack of response to ARP probes or a link-down condition.

30. The apparatus of claim 25 wherein:

the flow controller selects the firewall based on a source IP address and a destination IP address of the packet header.

31. The apparatus of claim 25 wherein:

the flow controller selects the firewall based on either a source IP address of the packet which is inbound to the interior network or a destination IP address of the packet which is outbound to the exterior network.

32. The apparatus of claim 25 wherein:

the flow controller identifies a client-server flow based on the information in the header of the packet and selects the firewall based on the identified client-server flow to transfer all of the packets of the identified client-server flow via same said selected firewall.

33. The apparatus of claim 32 wherein:

the flow controller monitors health of the firewalls by sending Ping packets through individual said firewalls, and selects another firewall of the firewall cluster to transfer the packets of the client-server flow when it detects failure of the selected firewall.

34. The apparatus of claim 25 wherein:

the flow controller has its own unique IP address distinct from the logical IP address and the unique IP addresses of the firewalls.

35. The apparatus of claim 25 wherein:

each firewall comprises a different interface of one or more firewall routers.

36. An apparatus for managing message traffic between an interior network and an exterior network in conjunction with a plurality of firewalls securing the interior network from intrusion from the exterior network, comprising:

a first flow controller defining an internal firewall cluster containing a plurality of the firewalls which are in the interior network, the internal firewall cluster being addressed by a first logical Internet Protocol (IP) address that is distinct from unique IP addresses of the firewalls contained within the internal firewall cluster, and further being addressed by a first associated media access control (MAC) address that is distinct from unique MAC addresses of the firewalls contained within the internal firewall cluster, the first flow controller being associated with the internal firewall cluster, being distinct from the firewalls contained within the internal firewall cluster, and being responsive to a first packet outbound to the exterior network and addressed to the first logical IP address or the first associated MAC address by selecting a first firewall from among the internal firewall cluster on a basis of information in a header of the first packet, addressing the first packet to the MAC address of the first firewall, and sending the first packet to the first firewall for transfer of the packet by the first firewall between the interior network and the exterior network; and a second flow controller defining an external firewall cluster containing a plurality of the firewalls which are in the exterior network, the external firewall cluster being addressed by a second logical IP address that is distinct from unique IP addresses of the firewalls contained within the external firewall cluster, and further being addressed by a second associated MAC address that is distinct from MAC addresses of the firewalls contained within the external firewall cluster, the second flow controller being associated with the external firewall cluster, being distinct from the firewalls contained within the external firewall cluster, and being responsive to a second packet inbound to the interior network and addressed to the second logical IP address or the second associated MAC address by selecting a second firewall from among the external firewall cluster on a basis of information in a header of the second packet, addressing the second packet to the MAC address of the second firewall, and sending the second packet to the second firewall for transfer of the packet by the second firewall between the exterior network and the interior network.

37. The apparatus of claim 36 wherein:

the first flow controller causes the first packet to be transferred from the interior network to the exterior network via the first firewall and a corresponding firewall in the external firewall cluster; and the second flow controller causes the second packet to be transferred from the exterior network to the interior network via the second firewall and a corresponding firewall in the internal firewall cluster.

38. The apparatus of claim 37 wherein:

the flow controllers cause each client-server flow to be transferred between the interior and the exterior network by a single firewall pair comprising a firewall in the external firewall cluster and a corresponding firewall in the internal firewall cluster.

39. The apparatus of claim 38 wherein:

each flow controller selects corresponding said firewall based on a source IP address and a destination IP address in the header of corresponding said packet.

40. The apparatus of claim 38 wherein:

the first flow controller selects the first firewall based on a source IP address in the header of the first packet, and the second flow controller selects the second firewall based on a destination IP address in the header of the second packet.

41. The apparatus of claim 36 wherein:

each flow controller has its own unique IP address distinct from the logical IP addresses and the IP addresses of the firewalls.

42. The apparatus of claim 41 wherein:

the flow controllers send Ping packets to each other through the firewalls of both of the clusters to monitor health of the firewalls.

\* \* \* \* \*